Patented Sept. 30, 1924.

1,510,132

UNITED STATES PATENT OFFICE.

JOHN C. BAKER, OF NUTLEY, NEW JERSEY, ASSIGNOR TO WALLACE & TIERNAN CO., INC., OF BELLEVILLE, NEW JERSEY, A CORPORATION OF NEW YORK.

PROCESS OF PRODUCING NITROGEN TRICHLORIDE.

No Drawing.  Application filed April 21, 1924.  Serial No. 708,061.

*To all whom it may concern:*

Be it known that I, JOHN C. BAKER, a citizen of the United States of America, residing at Nutley, in the county of Essex and State of New Jersey, have invented certain new and useful Improvements in Processes of Producing Nitrogen Trichloride, of which the following is a full, clear, and exact description.

I have heretofore discovered and developed a process of bleaching and maturing flour by the use of nitrogen trichloride gas for which I obtained a Patent No. 1,367,530, dated February 8, 1921. This process is now being used on a very extensive commercial scale and has been demonstrated to be a marked and important advance in the art. So extensively has the process come into practical use that the production of the bleaching gas in a simple and economical manner and on a large scale has become a most important consideration and the present application is based upon a process which I have discovered and perfected for this purpose.

I have produced this gas by a process which, at least for purposes of this case, may be regarded as involving no new discovery and which consists in bringing into reactive relations in a solution, chlorine and an ammonium salt, or ammonium hydroxide and removing the resultant nitrogen trichloride therefrom by the action of a current of air.

I have discovered, however, that the efficiency of this process is very greatly increased and a most important advantage gained if I permit the ingredients after being brought together to stand for a certain interval of time as this permits the necessary reaction to take place, it having been found that such reaction is not immediate nor sufficiently complete for good results until after such interval. I therefore follow any of the modified processes given in the following examples.

*Example 1.*—I mix a solution of chlorine with a solution of an ammonium salt or ammonium hydroxide, and allow this to stand for at least a minute and then by means of a current of air passed over or through or generally in contact with the solution, remove the resulting gases and pass them directly to the flour to be treated.

*Example 2.*—I dissolve chlorine gas in a solution of ammonium salt or hydroxide, allow the same to stand until the reaction is practically complete and then remove the gases by a current of air.

*Example 3.*—I dissolve an ammonium salt or ammonium gas in a solution of chlorine, allow the solution to stand for the necessary time interval and then remove the nitrogen trichloride by a current of air.

The removal of the nitrogen trichloride from the solution by means of air may be effected in various ways, for example, the solution, after standing, may be caused to trickle downwards through a tower filled with more or less finely divided inert material such as coke, fire brick or earthenware, and a current of air then passed through the same counter to the direction of flow and of such volume as to remove from the solution all of the nitrogen trichloride. This gas is then immediately available for bleaching.

Another method of removing the nitrogen trichloride is to spray the solution after it has stood for the required time with a stream of air of such volume that it will remove the nitrogen trichloride from the solution and then separating the exhausted spray from the air before passing the gas to the flour.

A third method of recovery is to merely force or bubble air through the solution after the latter has been permitted to stand for the proper time until the removal of the nitrogen trichloride is complete.

If the chlorine and ammonium salts be brought together in a solution and this aerated at once the result is greatly inferior to that gained by allowing the solution to stand until the proper reaction has taken place. For example, by my former method I recovered about 60% of the nitrogen trichloride whereas by my improved method I recover practically all or 100%.

The various plans above described for combining the chlorine and the ammonium compound and for removing from the solution the resulting nitrogen trichloride are manifestly but mere modifications or variations of the same essential steps. The desired product is thus cheaply produced in any quantity and by a process which is or need be practiced only during the period of use of the gas and merely to the extent of the demand for the same.

What I claim is—

1. The process herein described for producing nitrogen trichloride in gaseous form suitable for the bleaching of flour, which consists in bringing in reactive relation in a solution chlorine and an ammonium compound, allowing such solution to stand until the reaction is complete, and then removing from said solution the nitrogen trichloride by a current of air.

2. The process herein described of producing nitrogen trichloride in gaseous form suitable for the bleaching of flour, which consists in mixing chlorine water and an ammonium salt to form a solution, allowing such solution to stand until the reaction has taken place, and then removing from said solution the nitrogen trichloride by the action of a current of air.

3. The process herein described of producing nitrogen trichloride in gaseous form suitable for the bleaching of flour, which consists in bringing together chlorine and an ammonium salt in a solution, allowing such solution to stand until the reaction has taken place, causing the said solution to trickle down through a porous mass of inert material, and forcing a current of air upward through said material to remove the nitrogen trichloride.

In testimony whereof I hereto affix my signature.

JOHN C. BAKER.